United States Patent [19]

Lindberg

[11] Patent Number: 4,503,813
[45] Date of Patent: Mar. 12, 1985

[54] ENGINE COMBUSTION CONTROL SYSTEM AND METHOD EMPLOYING CONDENSATION OF SOME EXHAUST GAS

[75] Inventor: John E. Lindberg, Point Richmond, Calif.

[73] Assignee: Combustion Control Developments Ltd., Berkeley, Calif.

[21] Appl. No.: 511,524

[22] Filed: Jul. 7, 1983

[51] Int. Cl.³ .............................................. F02M 25/06
[52] U.S. Cl. ................................. 123/25 E; 123/25 B; 123/568; 123/570
[58] Field of Search ................. 123/25 R, 25 A, 25 B, 123/25 D, 25 E, 25 L, 25 P, 568, 570

[56] References Cited

U.S. PATENT DOCUMENTS

| | | | |
|---|---|---|---|
| 2,087,411 | 7/1937 | Lundquist | 123/25 A |
| 2,461,580 | 2/1949 | Wiczer et al. | 123/25 A |
| 2,671,311 | 3/1954 | Rohrbach | 123/25 R |
| 3,817,221 | 6/1974 | Nohira et al. | 123/25 R |
| 3,842,808 | 10/1974 | Cataldo | 123/25 P |
| 3,983,882 | 10/1976 | Billings | 123/25 A |
| 4,112,892 | 9/1978 | Lindberg | 123/25 E |
| 4,167,919 | 9/1979 | Woolley et al. | 123/25 E |
| 4,183,338 | 1/1980 | Lindberg | 123/25 E |
| 4,279,223 | 7/1981 | Csonka et al. | 123/25 R |
| 4,388,893 | 6/1983 | Apfel | 123/25 E |

Primary Examiner—Ira S. Lazarus
Attorney, Agent, or Firm—Owen, Wickersham & Erickson

[57] ABSTRACT

A combustion control system for an internal combustion engine. A control device with a vortex chamber has a tangential inlet connected to a gas supply at substantially atmospheric pressure, a second inlet, and an axial outlet connected directly to the gas inlet opening of the intake manifold. A condenser condenses water from the exhaust gas passing through the exhaust conduit. A gas inlet of a reactor device has a gas inlet connected directly to the exhaust manifold for drawing gas therefrom and an outlet connected to the second inlet of said control device by a conduit. The reactor device includes one or more ejectors for drawing in atmospheric air and for drawing in liquid water from the condenser, and for mixing the atmospheric air and water with gas from the exhaust manifold.

49 Claims, 11 Drawing Figures

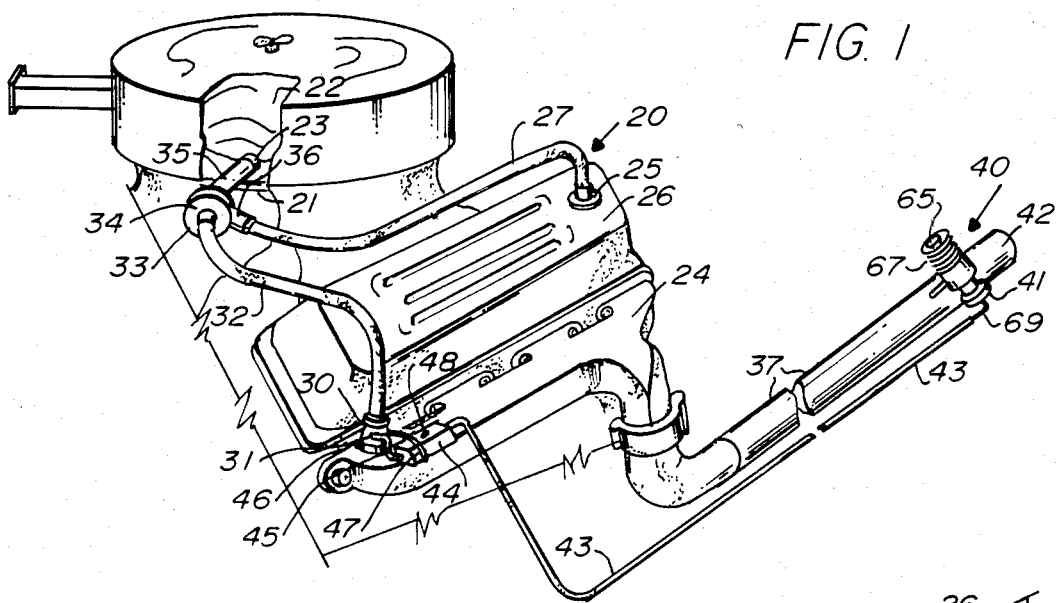
FIG. 1
FIG. 3
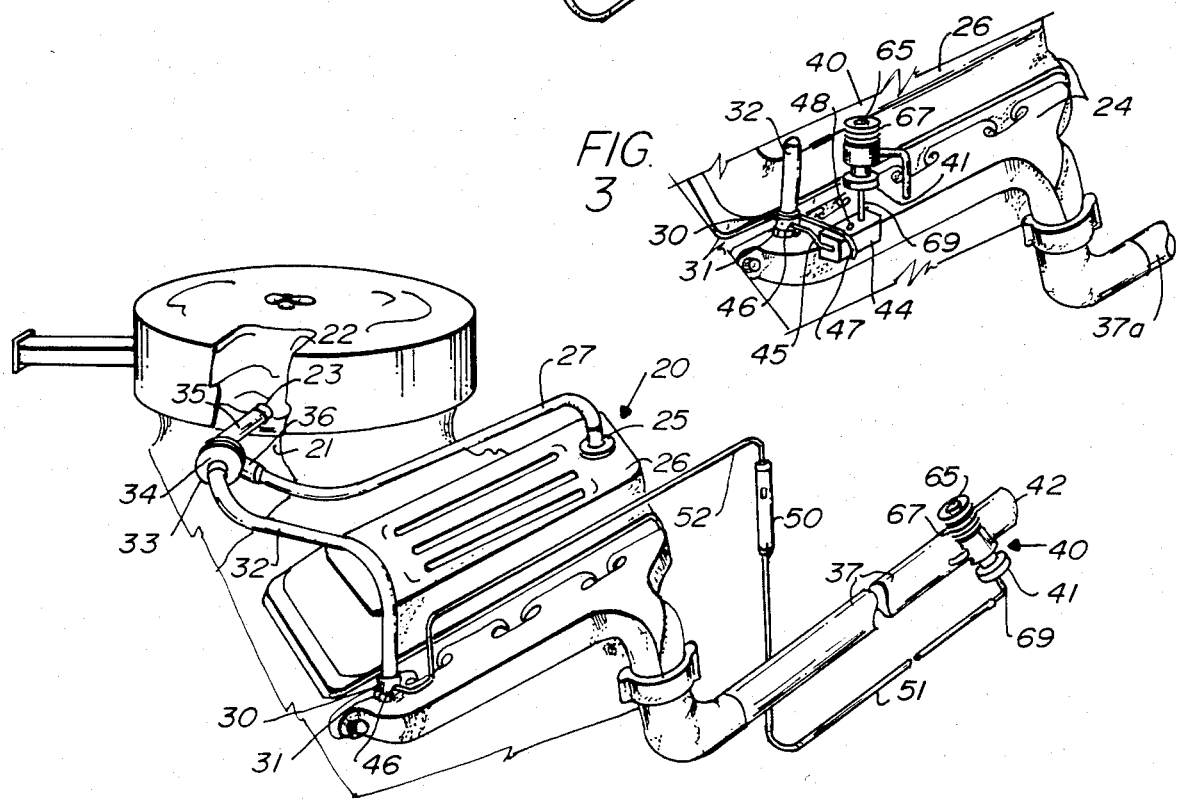
FIG. 2

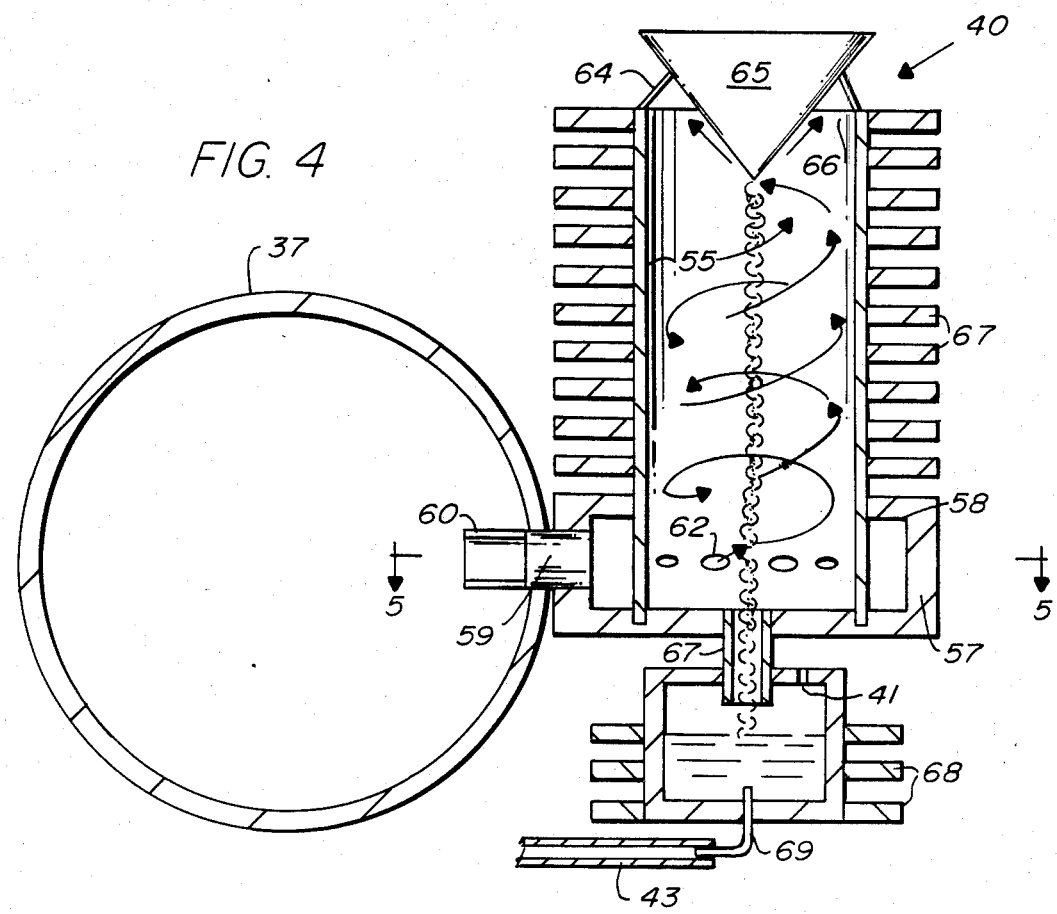
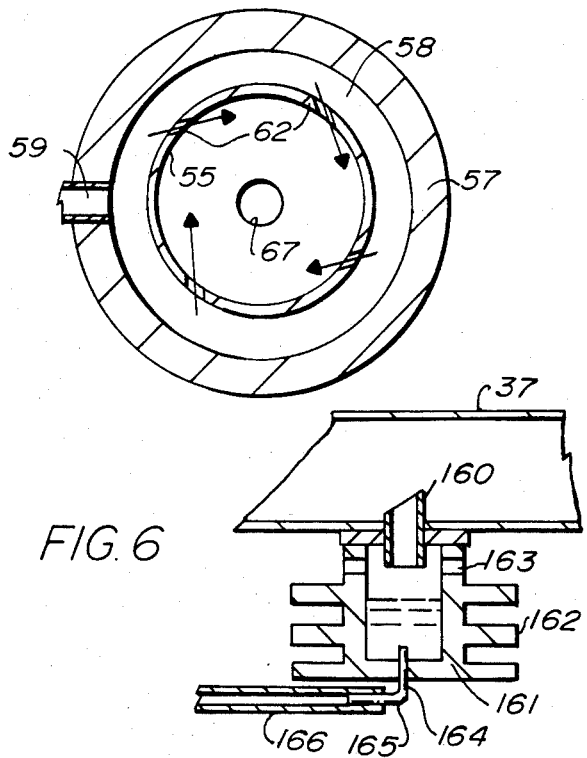
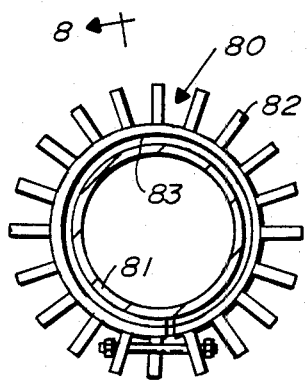

ENGINE COMBUSTION CONTROL SYSTEM AND METHOD EMPLOYING CONDENSATION OF SOME EXHAUST GAS

This invention relates to an improved combustion control system for internal combustion engines. This system employs condensation of some of the water vapor of the engine exhaust gas as a source of water to be added to the fuel to improve its combustion.

BACKGROUND OF THE INVENTION

Several devices are known which seek to improve the performance of internal combustion engines by the injection of water or water vapor. Such devices incorporate a reservoir which requires frequency refilling and has the further disadvantage that the water in them is subject to freezing. Also, the reservoir may be filled with hard water or even dirty water, both of which can cause problems, and the possibility of dirty water necessitates a filter.

An especially good device is that shown in my copending patent application, Ser. No. 348,867, filed Feb. 16, 1982, now U.S. Pat. No. 4,417,548.

The present invention eliminates the need for a reservoir by providing means for recovering water from the engine exhaust gases, for these gases contain plenty of water. For example, water is produced by the combustion of octane or iso-octane, by the reaction:

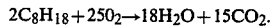

Gasoline, a blend of hydrocarbons, may be approximately represented as $C_8H_{17}$, in which case the equation becomes:

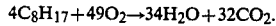

A simple calculation shows that for each gallon of gasoline consumed, 0.95 gallons of water is produced.

The amount of water required per gallon of fuel in order to improve engine performances varies from device to device and depends on driving conditions. One such system is described in my U.S. Pat. No. 4,183,338. This system requires typically about 0.3 to 1 gallon of water for each 10 gallons of fuel burned. It is clear then, that the reservoir could be eliminated if only 10% of the water in the engine exhaust were made available. Moreover, the condensed water is distilled water—clean and certainly not hard.

SUMMARY OF THE INVENTION

In its broadest aspect the invention relates broadly to an internal combustion engine employing water, and it includes the continuation of condensing liquid, principally water, but also including possibly some hydrocarbons from the engine exhaust gases and conducting that liquid or some of it to the engine for use there in some manner. The liquid is usually used for improving combustion in the combustion chamber.

The conducting or recirculation of the condensed water may be accomplished by use of the pressure of the exhaust, or (in a vehicle) by deceleration and inertia, if desired with the use of exhaust pressure. Gravity may be employed. Such force created by the flow of exhaust gas may used.

Various types of condensers may be used, as will be seen below.

The invention provides an improved combustion control system for an internal combustion engine having an intake manifold, a gas inlet opening into the intake manifold, an exhaust manifold, and an exhaust conduit connected to the exhaust manifold. As with some of my earlier inventions, the system preferably includes a vortex device having a vortex chamber with a tangential inlet connected to a gas supply at substantially atmospheric pressure. There is a second inlet to this chamber, and there is an axial outlet connected directly to the gas inlet opening into the intake manifold.

The present invention, however, replaces the reservoir for water, which has been used heretofore, with the condenser for condensing water from the exhaust gas passing through the exhaust conduit.

As in some earlier systems of mine, there is preferably a reactor device having a gas inlet connected directly to the exhaust manifold for drawing gas from the exhaust manifold. The reactor device has an outlet, which may be spaced well apart from the vortex device, but connected by a conduit to the second inlet of the vortex device. The reactor device including one or more ejectors for drawing atmospheric air into the reactor and also for drawing in condensed water. If desired, this may be done by two ejectors in parallel. In the reactor device, atmospheric air and the water are mixed with gas from the exhaust manifold and the mixture is sent via the conduit mentioned above to the second inlet of the vortex device.

In one form of the invention, the ejector is connected to the condenser by a first conduit that leads from the condenser to a small reservoir having an overflow opening. Exhaust pressure, deceleration and inertia, or gravity may move the water from the condenser to the reservoir, which is located at a level lower than the ejector and connected to the ejector. The suction of the ejector is balanced against the force of gravity to assure proper flow, by adjusting the vertical distance of the small reservoir below the ejector.

In another form of the invention, the condenser is connected to the ejector through a pressure-initiated, flow-controlled valve instead of the small reservoir, this valve responding to pressure differential above a threshold value to initiate the delivery of liquid to the ejector, through a liquid conduit attached thereto. Thereafter, flow controls the delivery.

Preferably, the condenser has a scoop perpendicular to the flow of exhaust gas in the engine exhaust conduit for picking up a portion of the exhaust gas.

Various types of condensers may be used, as will be seen from the following examples.

Exhaust gases also frequently contain unburned hydrocarbons, some of which can, with advantage, be recirculated with the water to the combustion chamber.

Other objects and advantages of the invention will become apparent from the drawings and the following description.

BRIEF DESCRIPTION OF THE DRAWINGS

FIG. 1 is a view in perspective of an automotive engine having a system embodying the principles of the invention, employing a reservoir between the condenser and the reactor device.

FIG. 2 is a similar view of a modified form of system also embodying the principles of the invention, employing a pressure-initiated, flow-controlled valve.

FIG. 3 is a similar view of a portion of another modified form of system employing a reservoir and gravity.

FIG. 4 is a view in cross section of a condenser embodying the principles of the invention, as used in FIGS. 1-3, the condenser shown here employing a fluidic vortex cooling device.

FIG. 5 is a view in section taken along the line 5—5 in FIG. 4.

FIG. 6 is a view in cross section of a modified form of condenser.

FIG. 9 is a view in section taken along the line 9—9 in FIG. 8.

DESCRIPTION OF SOME PREFERRED EMBODIMENTS

A complete system (FIG. 1)

Figure 7:
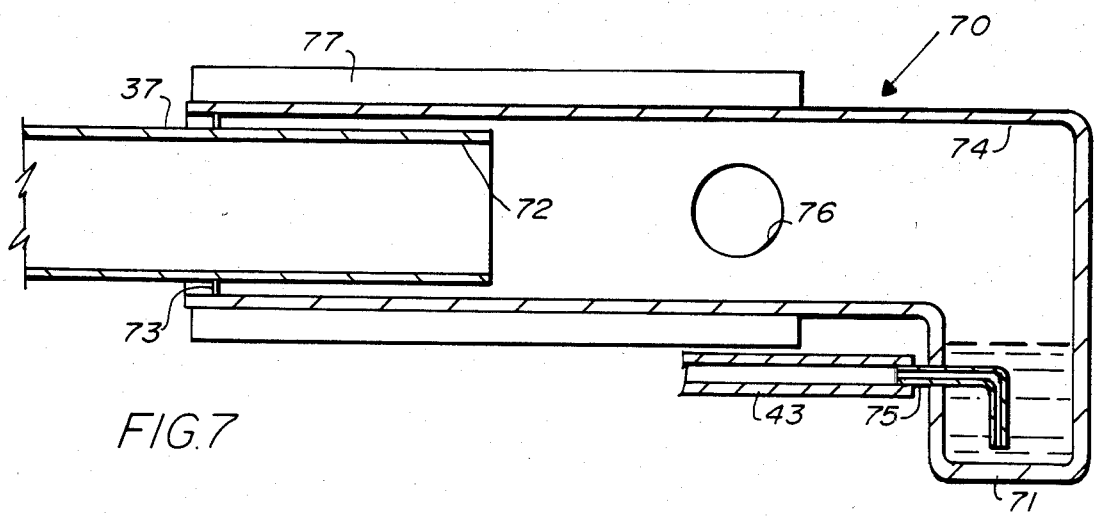
FIG. 7 is a view in cross section of another modified form of condenser embodying the principles of the invention, wherein exhaust gases are entrapped and mixed with cold air, as well as being cooled by air-cooled fins.

FIG. 1 shows in simplified form a system embodying the principles of the invention in connection with an engine 20 having an intake manifold 21 with a carburetor 22 and a PCV gas inlet 23 leading into the intake manifold 21 below the butterfly valve (or the like) of the carburetor 22. The engine 20 also has an exhaust manifold 24 and an opening 25 into its valve cover 26, in which a PCV valve (not present here) is usually mounted. In this instance a conduit 27 is attached directly to the opening 25.

A reactor 30 closely adjacent to the exhaust manifold 24 is connected to it through a tapped opening 31. A tube 32 connects the reactor 30 to a control device 33 having a vortex chamber 34 located closely adjacent to the intake manifold 21 to which a conduit 35 leads to the PCV gas inlet 23. The conduit 27 is attached to an inlet 36 leading tangentially into the vortex chamber 34 and producing the vortex. If PCV gas is not used, atmospheric air may be applied to the tangential inlet 36. The tube 32 leads axially into the vortex chamber 34.

An exhaust conduit 37 leads the exhaust gases away from the exhaust manifold 24, and these gases contain a considerable amount of water vapor, water in gaseous form mixed with carbon dioxide. The present inventions incorporate a condenser 40 which condenses a portion of this water vapor into liquid water. The water (and any condensed hydrocarbons) falls into a trap 41, while the exhaust gas flows out to atmosphere, via an outlet 42.

Water from the condenser trap 41 passes via a conduit 43 to a small reservoir 44 which is located *below* and fairly close to the reactor 30 and is connected to it by a conduit 45 leading to an inlet 46 of the reactor 30. The reservoir 44 is held in position by a suitable clamp 47 and has a vent-and-overflow opening 48. In this form of the invention, reliance can be made on the deceleration of the vehicle, which occurs from time to time, to pump the condensed water from the trap 41 into the reservoir 44. Alternatively, the condensed water can be forced from the trap 41 to the reservoir 44 by the pressure of the exhaust gases exerted upon the condensate in the trap 41. Both these deceleration and pressure systems can be used together as well as separately. If the reservoir 44 is overfilled, the excess flows out through the opening 48 and no attempt is made of recovery.

The suction force at the reactor inlet 46 draws the water from the reservoir 44 into the reactor 30. The force of gravity is matched to the suction force by adjusting the height of the reservoir 44 relative to the reactor 30, using the clamp 47 to hold the reservoir 44 at a convenient spacing from the exhaust manifold 24 and at the proper height. The *length* of the path from the condenser 40 to the reservoir 44 is very long—nearly the length of the car, e.g., 10 feet. The *height* to be traversed, a few inches is relatively small, and the *height* of the reactor 30 above the reservoir 44 is even smaller.

The reactor 30 is thus spaced away from the vortex control device 33 and from the condenser 40. Its gas inlet 31 is connected directly to the exhaust manifold 24 and draws gas therefrom. Preferably, as described in my copending U.S. patent application Ser. No. 348,867 filed Feb. 16, 1982, the reactor 30 comprises a first ejector for drawing in atmospheric air and mixing it with the gas from the exhaust conduit and a second ejector connected to the liquid conduit 45 for drawing in water from the conduit 45 according to the pressure differential established by the second ejector and for sending it into the atmospheric air drawn in by the first ejector.

A modified system (FIG. 2)

FIG. 2 shows a system that is much like that of FIG. 1 but in which there is no reservoir 44. Instead there is a valve 50 connected to the trap 41 by a conduit 51 and connected to the reactor's inlet 46 by a conduit 52. This valve 50 is preferably that shown, described, and claimed in my co-pending U.S. application Ser. No. 348,700, filed Feb. 16, 1982, and also shown in application Ser. No. 348,867 referred to above and filed that same day. In this form of the invention, the suction force of the reactor 30 is used to draw water from the condenser trap 41 to the reactor 30, through the valve 50.

A gravity-fed system (FIG. 3)

In FIG. 3, the exhaust pipe 37a at the condenser 40 is higher than the reservoir 44, so that the condensed water flows down by gravity from the trap 41 to the reservoir 44. Overflow can leave the reservoir 44 via the overflow opening 48.

A vortex-type condenser (FIGS. 4 and 5)

FIGS. 4 and 5 show a preferred form of condenser 40. Its housing 55 is located adjacent to the exhaust conduit 37, supported by a suitable clamp. The housing 55 is supported by and in a cylindrical base ring 57 that provides an enclosed annular chamber 58 around the housing 55. An inlet tube 59 has a scoop 60 inside the conduit 37 to conduct some of the exhaust gas from the conduit 37 into the chamber 58.

The scoop 60 is inserted directly into the tail pipe 37. It is oriented to obtain the maximum extraction of exhaust gases with the minimum impedance to flow. The extracted gases go directly into the chamber 58.

Tangential entry of the exhaust gases is employed. For example, the housing 55 may be drilled at various points around its periphery to provide substantially tangential entry ports 62 into the housing 55. Other structures can be used to provide the same effect. The exhaust gas there enters the housing 55 in a vertical pathway and moves upwardly in a generally helical path. This vertical movement tends to raise the temperature of the gas higher, but cooling fins 63 on the outer wall of the housing 55 help to keep the housing wall cool and either balance or overbalance the heating effect. At the upper end of the housing 55, rods 64 support an inverted conical member 65, leaving an annular outlet space 66 where higher temperature gases escape to the atmosphere. Meanwhile much of the gas, the cooler portion thereof flows back down along and around the axis of the helical vortex, all the while cooling further, and moisture condenses from this counterflow of cooled gas and drops down through a bottom central conduit 67 into the trap 41, which also has cooling fins 68. The cooling typically is between 25° F. and 100° F. The conduit 43 is connected to a bottom outlet tube 69.

A scoop-trap condenser (FIG. 6)

FIG. 6 shows a modified form of the invention, in which a scoop 160 is provided near the end of the exhaust pipe 37 causing a fraction of the exhaust gas to flow down the scoop 160 into a condenser-trap 161. The condenser-trap 161 has fins 162 and one or more vents 163. It also has a bottom opening 164 whence a tube 165 leads to a tubing 166 going back to the reactor 30, as in FIGS. 1 and 2.

A condenser mixing cool air with the exhaust gas (FIG. 7)

FIG. 7 shows a condenser 70 having a reservoir 71. The condenser 70 is attached to the end 72 of the tail pipe 37 in such a manner as to provide an annular gap 73 through which ambient air is drawn into the condenser 70 by the Venturi effect produced by the exhaust gas stream. The mixing of this cool ambient air with the outer layer of hot exhaust gases, the coolest portion of these gases, reduces the temperature of these gases to the point where the mixture is supersaturated, and water vapor is thus converted to liquid droplets. These droplets impinge on the relatively cool surface 74 of the condenser 70 and are collected in the reservoir 71. In addition, there is further cooling by air-cooled fins 77. As a result of the pressure differential created within the condenser 70 or inertial pumping or the effect of the reactor 30 or the like, the water is withdrawn from the reservoir 71 by an extractor 75 and is carried to the point of use through the conduit 43. Exhaust ports 76 are provided for escape of the exhaust gases and are sized enough smaller than the pipe 37 to provide acceptable impedance, so as to pressurize the reservoir 71 and help force water back to the reactor 30.

Figure 8:
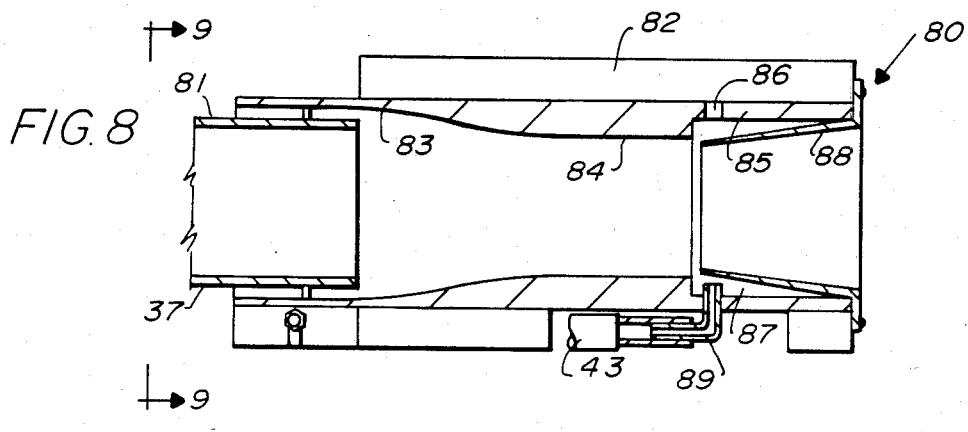
FIG. 8 is a view in cross section of another modified form of condenser generally like that of FIG. 6, wherein the exhaust gas is additionally cooled by a venturi type of device.

A condenser with a venturi throat (FIGS. 8 and 9)

FIGS. 8 and 9 show a condenser 80 attached to the end of the tail pipe 37 and having an open end 81 for the outflow of exhaust gas. The attachment provides an annular space 81 between the tail pipe 37 and the condenser 80, through which ambient air enters. The condenser 80 has exterior cooling fins 82, and its internal wall is shaped to provide a tapered portion 83 leading into a narrow neck 84 followed by a wide end portion 85 having an upper vent 86 and a lower condensation well 87. A frustoconical exit tube 88 for the exhaust gases enables expansion and cooling. Cooling and condensation occurs in the neck 84 and in the end portion 85 due to the cooling of the coolest outer layer of the exhaust gases by the increasing cold air from the atmosphere, the cooling action of the air-cooled fins 82, and the venturi accelerational expansion. The condensate is trapped in the well 87 by the edge of the frustoconical tube 88. An outlet tube 89 leads from the well 87 and is connected to the conduit 43.

Figure 10:
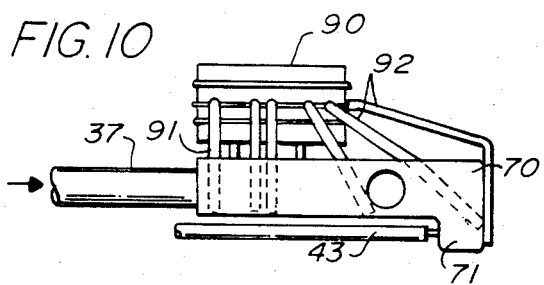
FIG. 10 is a view in side elevation and partly in section of a modified form of condenser embodying the principles of the invention incorporating a refrigerating unit and in which a heat-transfer fluid flows.

A condenser employing heat pipes and refrigeration (FIG. 10)

The condenser 70 shown in FIG. 10 may be essentially like that in FIG. 7 (or the condenser 80 of FIGS. 8 and 9 may be used) but it includes refrigerating means to cool the inner surface of the condenser 70. A finned radiator 90 holding a heat-transfer fluid is mounted on the condenser 70 by means of thermal isolators 91. The outlets from the radiator 90 may be connected to the condenser 70 by means of a sealed system incorporating a plurality of heat pipes 92 having wicks on their inside wall. The transfer fluid in each pipe 92 flows by capillary action along the wick from the radiator 90 to the hot-gas exhaust area 93 and helps to condense the water in the exhaust gases by heat transfer through the walls of the heat pipes 92. This action also vaporizes the heat transfer fluid, which is then conducted back to the refrigerator 90 via the central portion of the pipes 93. At the refrigeration 90 it is cooled and flows again into the wicks and is thereby returned to the condenser 70 as a liquid. THe heat pipes 92 may have fins outside the condenser 70 to aid in or accomplish the cooling of the heat-transfer fluid.

Figure 11:
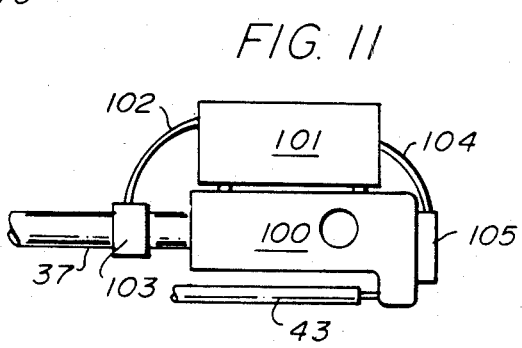
FIG. 11 is a view in side elevation of another modified form of condenser, wherein the condenser surface is cooled by an absorption refrigerator.

A condenser with absorption refrigeration (FIG. 11)

FIG. 11 shows a condenser 100 that is essentially the same as the condenser 70 in FIG. 7 but with the addition of means to cool the condenser surface. An absorption refrigerator 101 is mounted on the top of the condenser 100. The hot end of the refrigerator is connected by a conduit 102 to a clamp 103 which is mounted on the tail pipe 36. The cold end is connected by a conduit 104 to a terminal 105 which is in good thermal contact with the condenser 100.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. In an internal combustion engine employing water in the combustion process and having a combustion chamber with an intake manifold and an exhaust conduit, the combination of
condensing means for condensing liquid from the engine exhaust gases and having scoop means perpendicular to the flow of exhaust gas for picking up a portion of the exhaust gas at the total pressure of said gas,
liquid conducting means employing said total pressure for forcing and for conducting such condensed liquid to said intake manifold, and
means for mixing atmospheric air with said liquid before supplying it to said intake manifold.

2. In a vehicle having an internal combustion engine at its front end employing water in its combustion chamber along with hydrocarbons or other hydrogen-containing fuel and having an intake manifold and a rearwardly extending exhaust gas conduit, the combination of
a water reservoir near said engine at said front end,
supply means connecting said reservoir to said intake manifold to supply water to said manifold,
condensing means at the rear of said vehicle for condensing water from the exhaust gases of the combustion chamber, and
recirculation means for sending at least some of said condensed water to said reservoir, said recirculation means including the deceleration inertia of said vehicle as a force for effecting said recirculation from time to time during vehicle deceleration.

3. The combination of claim 2 in which said condensing means also condenses some unburned hydrocarbons in said exhaust gases and said recirculation means sends them also back to said combustion chamber.

4. The combination of claim 2, wherein said recirculation means employs the combination of pressure derived from said exhaust gases and of said deceleration inertia of said vehicle as the primary force for effecting said recirculation.

5. A combustion control system for an internal combustion engine having an intake manifold, a gas inlet opening into said intake manifold, a combustion chamber producing exhaust gas, and an exhaust outlet, including in combination:
a vortex device having a vortex chamber with a tangential inlet connected to a gas supply at substantially atmospheric pressure, a second inlet, and an axial outlet connected directly to said gas inlet opening of said intake manifold,
condenser means for condensing water from the exhaust gas,
a reactor device having a gas inlet connected to said exhaust outlet for drawing gas therefrom and an outlet connected to said second inlet of said vortex device by a first conduit, said reactor device including ejector means for drawing in atmospheric air and for drawing in water from said condenser means and for mixing said atmospheric air and said water with gas from said exhaust outlet.

6. The system of claim 5 wherein said ejector means is connected to said condenser means by a second conduit connected to said condenser means, a third conduit connected to said ejector means and a reservoir located at a level lower than said ejector means and having an inlet connected to said second conduit, an outlet connected to said third conduit, and water-overflow means for ridding the reservoir of excess water.

7. The system of claim 6 having height-adjustment means for adjusting the height of said reservoir relative to said reactor means in order to bias the flow rate of water from said reservoir to said ejector means through said third conduit.

8. The system of claim 6 having means for applying the total pressure of said exhaust gas to impel the condensed water from said condenser means to said reservoir.

9. The system of claim 6 including a moving vehicle driven by said engine having means for employing the deceleration of said vehicle and the inertia of the condensed water to impel, from time to time, condensed water from said condenser means to said reservoir.

10. The system of claim 9 having, in addition, means for also applying pressure from said exhaust gas to said condensed water for impelling it from said condenser means to said reservoir.

11. The system of claim 6 wherein said condenser means is located at a height above said reservoir, whereby said condensed water flows from said condenser means to said reservoir principally by gravity and from said reservoir to said ejector means by the suction force generated in said reactor device.

12. The system of claim 5 wherein said condenser means is connected to said reactor device via pressure-initiated, flow-controlled valve means for controlling the water flow directly to said ejector means in response initially to a predetermined pressure differential above a threshold value and subsequently by the flow from said condenser means through said valve, as a result of the suction force generated by said reactor device.

13. The system of claim 5 wherein said condenser means has scoop means perpendicular to the flow of exhaust gas for picking up a portion of the exhaust gas and for picking up the total pressure from said flow for use in sending the condensed water to said reactor device.

14. The system of claim 13 wherein said condenser means has a collecting chamber into which said scoop leads, said chamber having exhaust outlet means for gas and finned cooling walls exposed to atmosphere.

15. The system of claim 5 wherein said condenser means comprises
a housing having a cylindrical chamber, with tangential entry means,
said housing having a lower wall and an upper end with an inverted conical plug partially closing the upper end except for an annular outlet therearound, said housing also having a drain passage in said lower wall connected by conduit means to said reactor device.

16. The system of claim 15 wherein said housing has radially outwardly extending cooling fins.

17. The system of claim 5 having an exhaust conduit with an end portion, wherein said condenser means comprises a tubular member of larger diameter than said exhaust conduit connected to the end portion thereof to provide annular spacing between said tubular member and said exhaust conduit for the entry of cooling air therethrough, and water collecting means at a bottom portion thereof.

18. The system of claim 17 wherein said tubular member includes a radially-inwardly tapered portion leading from the end of said exhaust conduit to a narrow neck portion, followed by a wider portion for further cooling and condensation, with said water collecting means at the bottom of said wider portion.

19. The system of claim 18 having a frustoconical tube widening out to an open end, inside said wide-portion, its smaller diameter portion being inwardly spaced therefrom but closed off around the outside of its wider end.

20. The system of claim 5 having refrigerating heat-exchanger means mounted on said condenser means for keeping the walls of said condenser means cold.

21. The system of claim 20 wherein said condenser and said heat exchanger means are connected together by heat pipes.

22. The system of claim 5 wherein said condenser means is equipped with a series of heat pipes having an internal portion inside said condenser means exposed to said hot exhaust gas and an internal cooling portion outside said condenser means exposed to atmosphere.

23. A combination control system for an internal combustion engine having an intake manifold, a gas inlet opening into said intake manifold, and an exhaust, including in combination:
a vortex device having a vortex chamber with a tangential inlet connected to a gas supply, a second inlet, and an axial outlet connected directly to said gas inlet opening of said intake manifold,
condenser means for condensing water from the exhaust gas,
a reactor device having a gas inlet connected to said exhaust for drawing gas therefrom and an outlet connected to said second inlet of said vortex device by a first conduit, said reactor device including ejector means for drawing in liquid condensed by said condenser means and for mixing said water with gas from said exhaust.

24. The system of claim 23 wherein said ejector means is connected to said condenser means by a second conduit connected to said condenser means, a third conduit connected to said ejector means and a reservoir located at a level lower than said ejector means and having an inlet connected to said second conduit an outlet connected to said third conduit, and water overflow means for ridding the reservoir of excess water.

25. The system of claim 23 wherein said condenser means is connected to said reactor device via pressure-initiated, flow-controlled valve means for controlling the water flow directly to said ejector means in response initially to a predetermined pressure differential above a threshold value and subsequently by the flow from said condenser means through said valve, as a result of the suction force generated by said reactor device.

26. The system of claim 23 wherein said condenser means has scoop means perpendicular to the flow of exhaust gas for picking up a portion of the exhaust gas and for picking up the total pressure from said flow for use in sending the condensed water to said reactor device.

27. The system of claim 26 wherein said condenser means has a collecting chamber into which said scoop leads, said chamber having exhaust outlet means for gas and finned cooling walls exposed to atmosphere.

28. The system of claim 26 wherein said condenser means comprises
a housing having a vertical cylindrical chamber,
a larger-diameter concentric cylindrical chamber surrounding a lower portion of said housing, said housing having tangential entry means leading into said vertical cylindrical chamber from said concentric chamber,
said housing having an upper end with an inverted conical plug partially closing the upper end except for an annular outlet therearound, said housing also having a water collecting trap connected by conduit means to said reactor device.

29. The system of claim 28 wherein said housing has radially outwardly extending cooling fins.

30. The system of claim 23 having an exhaust conduit with an end portion, wherein said condenser means comprises a tubular member of larger diameter than said exhaust conduit connected to the end portion thereof to provide annular spacing between said tubular member and said exhaust conduit for the entry of cooling air therethrough, and water collecting means at a bottom portion thereof.

31. The system of claim 30 wherein said tubular member includes a radially-inwardly tapered portion leading from the end of said exhaust conduit to a narrow neck portion, followed by a wider portion for further cooling and condensation, with said water collecting means at the bottom of said wider portion.

32. The system of claim 31 having a frustoconical tube widening out to an open end, inside said wide-portion, its smaller diameter portion being inwardly spaced therefrom but closed off around the outside of its wider end.

33. The system of claim 23 having refrigerating heat-exchanger means mounted on said condenser means to keeping the walls of said condenser means cold.

34. The system of claim 23 wherein said condenser and said heat exchanger means are connected together by heat pipes.

35. The system of claim 23 wherein said condenser means is equipped with a series of heat pipes having an internal portion inside said condenser means exposed to said hot exhaust gas and an internal cooling portion outside said condenser means exposed to atmosphere.

36. A combustion control system for an internal combustion engine having an intake manifold with a throttle, a PCV gas inlet opening into said intake manifold, an exhaust manifold, an exhaust conduit connected to said exhaust manifold, and a PCV gas conduit, including in combination:
a vortex device having a vortex chamber with a tangential inlet connected to said PCV gas conduit, an axial inlet, and an axial outlet connected directly to said PCV gas inlet opening of said intake manifold,
condenser means connected to said exhaust conduit for condensing water from the exhaust gas passing through said exhaust conduit,
pressure-initiated, flow-controlled valve means connected to said condenser means for responding initially to a predetermined pressure differential above a threshold value and subsequently by the flow therethrough to deliver water through a water conduit attached thereto,
a reactor device spaced away from said condenser means having a gas inlet connected directly to said exhaust conduit for drawing gas therefrom and an outlet spaced well apart from said vortex device and connected to said axial inlet of said vortex device by a connecting conduit, said reactor device comprising
first ejector means for drawing in atmospheric air and mixing it with gas from said exhaust conduit, and
second ejector means connected to said water conduit for drawing in water from said water conduit according to the pressure differential established by said second ejector means for sending it into the atmospheric air drawn in by said first ejector means.

37. The system of claim 36 wherein said condenser means has scoop means perpendicular to the flow of exhaust gas for picking up a portion of the exhaust gas and for picking up the total pressure from said flow for use in sending the condensed water to said reactor device.

38. A method of operating an internal combustion engine employing water in the combustion process and having an intake manifold, including the steps of condensing liquid from a portion of the engine exhaust gases while taking off the total pressure of said exhaust gases, conducting such condensed liquid to said intake manifold of the engine for use there, said conducting employing said total pressure as an impelling force, mixing atmospheric air with said condensed liquid, and introducing the resultant mixture into said intake manifold.

39. A method for operating an internal combustion engine inside and at the forward end of a moving vehicle, said engine employing water in its combustion chamber along with hydrocarbons or other hydrogen-containing fuel, said engine having an intake manifold leading to said combustion chamber and an exhaust conduit leading to the rear of said vehicle, including the steps of condensing water from the exhaust gases of the combustion chamber adjacent the rear end of said vehicle, and intermittently sending at least some of said condensed water to a reservoir adjacent the front end of said vehicle by utilizing the deceleration inertia of said vehicle during intermittent deceleration, and sending water from said reservoir to said intake manifold as needed.

40. The method of claim 39 in which said condensing means also condenses some unburned hydrocarbons in said exhaust gases and said recirculation means sends them also back to said combustion chamber.

41. The method of claim 39 wherein said sending step employs the combination of deriving pressure from said exhaust gases and of using said deceleration inertia of said vehicle as the primary force for effecting movement of said water to said reservoir.

42. A method for combustion control of an internal combustion engine having an intake manifold, a gas inlet opening into said intake manifold, a combustion chamber producing exhaust gas, an exhaust manifold, and an exhaust conduit connected to said exhaust manifold and conducting exhaust gas, including the steps of:

condensing water from the exhaust gas, conveying said water to a reactor device having a gas inlet connected directly to said exhaust manifold for drawing gas therefrom and an outlet leading to a first conduit, drawing into said reactor device both atmospheric air and said condensed water means, mixing said atmospheric air and said water with gas from said exhaust manifold, sending the mixture into said first conduit and thence to an axial inlet into a vortex device drawing into said vortex device via a tangential opening additional gas at atmospheric pressure, mixing that gas with said mixture, and sending the resultant mixture into said intake manifold.

43. The method of claim 42 including in said conveying step, first sending said water to a reservoir located at a level lower than said reactor device and having water-overflow means for ridding the reservoir of excess water, and subsequently conveying said water from said reservoir to said reactor device.

44. The method of claim 43 including for adjusting the height of said reservoir relative to said reactor device in order to bias the flow rate of water from said reservoir to said reactor device.

45. The method of claim 43 including applying pressure from said exhaust gas to impel the condensed water to said reservoir.

46. The method of claim 43 as applied to a moving vehicle driven by said engine, including employing the deceleration of said vehicle and the inertia of the condensed water to impel the condensed water to said reservoir.

47. The method of claim 46 including, in addition, applying pressure from said exhaust gas to said condensed water for impelling it to said reservoir.

48. The method of claim 43 including performing said condensing step at a height above said reservoir, causing said condensed water to flow to said reservoir principally by gravity.

49. The method of claim 42, including flowing the condensed water to said reactor device via a pressure-initiated, flow-controlled valve means, controlling the valve and thereby the water flow directly to said reactor device in response initially to a predetermined pressure differential above a threshold value and subsequently by the flow through said valve, as a result of the suction force generated by said reactor device.

* * * * *